No. 773,988. PATENTED NOV. 1, 1904.
D. A. RYAN.
LUNCH BUCKET OR PAIL.
APPLICATION FILED MAR. 8, 1904.

NO MODEL.

Witnesses
Chas. K. Davis.
Wm. N. Moore

Inventor
Daniel A. Ryan
by W. M. Davis
Attorney

No. 773,988. Patented November 1, 1904.

UNITED STATES PATENT OFFICE.

DANIEL A. RYAN, OF MIDLAND, MARYLAND.

LUNCH BUCKET OR PAIL.

SPECIFICATION forming part of Letters Patent No. 773,988, dated November 1, 1904.

Application filed March 8, 1904. Serial No. 197,143. (No model.)

*To all whom it may concern:*

Be it known that I, DANIEL A. RYAN, a citizen of the United States, residing at Midland, in the county of Allegany and State of Maryland, have invented certain new and useful Improvements in Lunch Buckets or Pails, of which the following is a specification.

My invention relates to improvements in lunch buckets or pails; and the object of my invention is the provision of a bucket or pail which will provide for the carrying of the lunch in one compartment and for the carrying of a beverage in another compartment, the beverage-compartment having means for straining the liquid, also permitting the easy drinking of the beverage from the bucket and for keeping the coffee or tea, as the case may be, in a clean and warm condition.

Another object of my invention is the provision of a bucket or pail which will insure the easy carrying of the lunch and beverage and for keeping both in a clean condition and permitting the drinking with ease from the bucket and which bucket will be of inexpensive production and entirely practical and useful.

With these objects in view my invention consists of a lunch pail or bucket embodying novel features of construction and combination of parts, substantially as disclosed herein.

Figure 1:
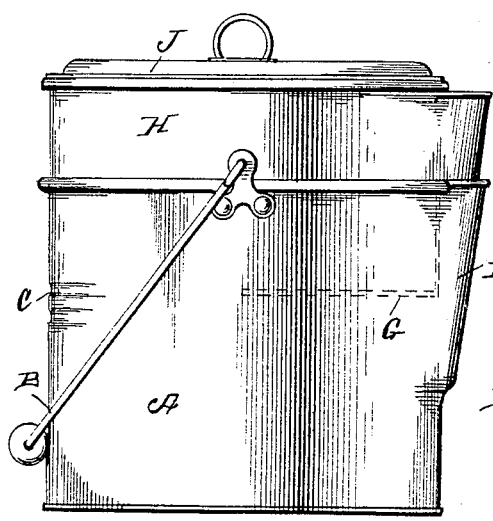
Figure 2:
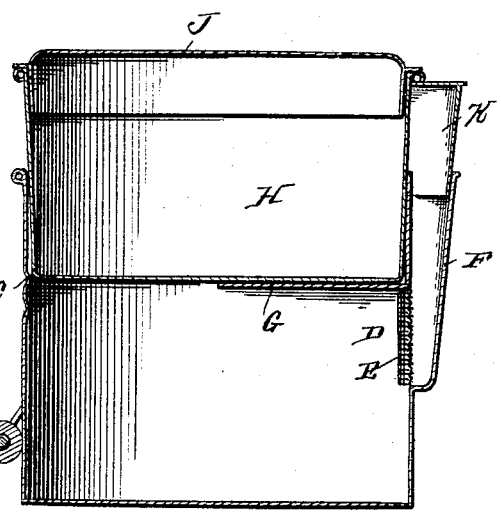
Figure 3:
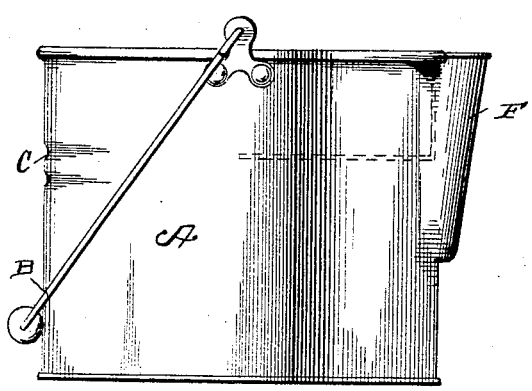
Figure 4:
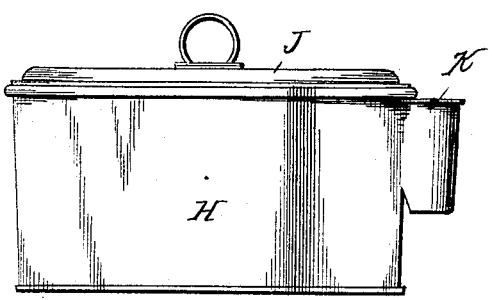

Figure 1 represents a side elevation of the complete pail or bucket. Fig. 2 represents a vertical central sectional view. Fig. 3 represents a side view of the pail or bucket section forming the beverage-compartment, and Fig. 4 represents a side view of the lunch-compartment.

In the drawings the letter A designates the lower section of the pail or bucket, provided with the carrying bail or handle B, also having the rib C, the opening D, provided with a strainer E, and the drinking-spout F, and further provided with the guard-plate G, which extends transversely across the bucket immediately above the strainer.

Fitting in the pail or bucket which forms the lower beverage-compartment is the lunch-compartment H, which has its bottom resting on the rib and on the guard-plate, and the lunch-compartment is provided with a tight-fitting cover J and with a spout stopper or closure K, which when the lunch-compartment is in place fits in the drinking-spout of the lower compartment.

It will be seen that the upper section forms a convenient compartment for carrying lunch, and that the lower compartment serves a like purpose for carrying coffee, tea, or other suitable beverage, and that the peculiar construction of the spout and closure keeps the beverage clean and warm and affords a perfect drinking-spout.

I claim—

1. A lunch pail or bucket, consisting of the lower compartment to receive a liquid and having a drinking-spout, an upper lunch-compartment having a stopper or closure for the drinking-spout.

2. A lunch pail or bucket, composed of the lower compartment having a drinking-spout provided with a strainer, a guard-plate in the lower compartment, and an upper lunch-compartment having a stopper or closure for the drinking-spout.

3. A lunch pail or bucket, consisting of the lower section having a bail or handle, a drinking-spout and a guard-plate contiguous to the spout, an upper lunch-compartment fitting in the lower section and having its bottom resting on the guard-plate.

In testimony whereof I have signed my name to this specification in presence of two witnesses.

DANIEL A. RYAN.

Witnesses:
 CHARLES E. METZ,
 ALLAN B. SPIER.